(12) United States Patent
Azaiz

(10) Patent No.: US 10,046,857 B2
(45) Date of Patent: Aug. 14, 2018

(54) METHOD FOR CONTROLLING A FLYING OBJECT FOR CLEANING SURFACES

(71) Applicant: Ridha Azaiz, London (GB)

(72) Inventor: Ridha Azaiz, London (GB)

( * ) Notice: Subject to any disclaimer, the term of this patent is extended or adjusted under 35 U.S.C. 154(b) by 0 days.

(21) Appl. No.: 15/323,722

(22) PCT Filed: Jul. 5, 2015

(86) PCT No.: PCT/DE2015/000335
§ 371 (c)(1),
(2) Date: Jan. 3, 2017

(87) PCT Pub. No.: WO2016/004914
PCT Pub. Date: Jan. 14, 2016

(65) Prior Publication Data
US 2017/0349278 A1    Dec. 7, 2017

(30) Foreign Application Priority Data

Jul. 5, 2014   (DE) .................. 10 2014 009 903

(51) Int. Cl.
  *G01C 23/00*   (2006.01)
  *B64C 39/02*   (2006.01)
  (Continued)

(52) U.S. Cl.
  CPC ............ *B64C 39/024* (2013.01); *B08B 1/002* (2013.01); *B25J 11/0075* (2013.01); *F24S 40/20* (2018.05);
  (Continued)

(58) Field of Classification Search
  CPC .............. B64C 39/024; B64C 2201/12; G05D 1/0088; B08B 1/002; B25J 11/0075; F24J 2/461; E04G 23/002; H02S 40/10
  See application file for complete search history.

(56) References Cited

U.S. PATENT DOCUMENTS 5,943,956 A * 8/1999 Marquez ................ B41F 35/06
                                                    101/423
6,419,190 B1   7/2002 Nguegang
(Continued)

FOREIGN PATENT DOCUMENTS

DE    102007033485    1/2009
DE    102009048778    4/2011
(Continued)

OTHER PUBLICATIONS

Window cleaning drones, From ISR of PCT/DE2015/000057 URL: http://window-cleaning-drones.com/ As discussed in International Search Report of PCT/DE2015/00057.
(Continued)

*Primary Examiner* — Ian Jen

(57)    ABSTRACT

1. Method for controlling a flying body for cleaning surfaces
2.1. Flying bodies can cover large distances between arrangements of smooth and curved surfaces without requiring manual manipulation. This reduces personnel requirements and enables large surfaces to be maintained, for example solar power stations, in a fully automated manner.
2.2. The method for controlling a flying body for cleaning surfaces consists of detecting the surrounding surfaces of an object to be cleaned, directing the flying body with respect thereto and structuring the flight path. As a result, the surface can be cleaned particularly efficiently and, if needed, worked on further.
2.3. Said method for controlling a flying object for cleaning surfaces is suitable for use on glass facades or on solar power stations, particularly in arid regions.

5 Claims, 3 Drawing Sheets

Routine

Figure 1:
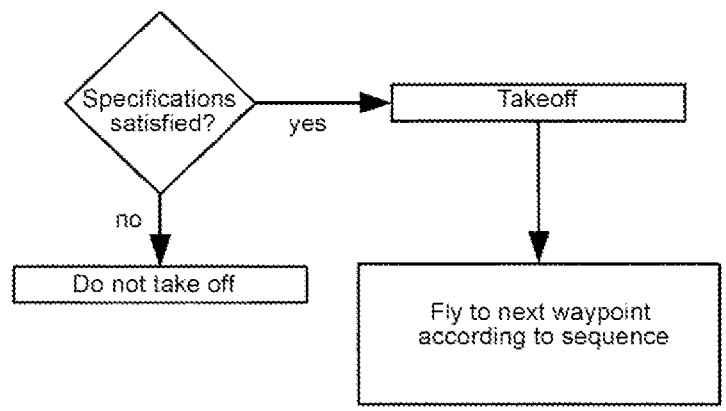

(51) Int. Cl.
- *B25J 11/00* (2006.01)
- *G05D 1/00* (2006.01)
- *B08B 1/00* (2006.01)
- *F24S 40/20* (2018.01)
- *E04G 23/00* (2006.01)
- *H02S 40/10* (2014.01)

(52) U.S. Cl.
CPC ........ *G05D 1/0088* (2013.01); *B64C 2201/12* (2013.01); *E04G 23/002* (2013.01); *H02S 40/10* (2014.12)

(56) References Cited

U.S. PATENT DOCUMENTS

| | | |
|---|---|---|
| 2010/0712094 | 8/2011 | Marcus Robert |
| 2013/0257975 A1* | 10/2013 | Aoyama ................ B41J 2/1714 347/28 |

FOREIGN PATENT DOCUMENTS

| | | |
|---|---|---|
| DE | 102012025499 | 6/2014 |
| KR | 20030025662 | 3/2003 |
| WO | WO2013076712 | 5/2013 |

OTHER PUBLICATIONS

GeoBeats TechNews, "Cleaning Device Concept Triggers Tiny Robots to Clean Your House", URL: https://www.youtube.com/watch?v=wJltbcHYZh4 As discussed in International Search Report of PCT/DE2015/00057.

* cited by examiner

Routine

Routine

Direction of Flight

Routine

METHOD FOR CONTROLLING A FLYING OBJECT FOR CLEANING SURFACES

It is known to use flying bodies such as drones for delivering packages, whereby, for a variety of reasons, doing so has not yet become practicable.

The route of the drone must be pre-programmed within tight flight path tolerances, which are flown both horizontally and vertically.

Furthermore, the flight path must be highly modifiable, because adjustments must be made for quite large and chaotically arranged obstacles along the flight path toward, for example, a solar power plant or rooftop.

In terms of safety-related technology, the application for package deliveries is safety-sensitive due to normally taking place in areas frequented by large numbers of people.

The invention specified in claim 1 is based on the problem of cleaning dirt from surfaces such as solar power plants, glass facades or roofs in a structured manner using a high level of automation and expending a minimum of energy, and, if necessary, enabling additional work to be done.

This problem is solved by the features listed in claim 1 (if necessary, by a verbatim citation of the features).

In a further embodiment according to claim 1, the object to be cleaned can be detected and a flying body oriented and/or aligned with said object while expending a minimum of energy.

The sensing of geometric information, for example three-dimensional information, enables alignment in both the horizontal plane and the vertical plane, therefore translationally with respect to the object, in addition to rotationally with respect to the object.

The detection of objects, edges or their contours as well sensing the distance away from them favors the design of energy-efficient and thus organized flight paths.

In particular, the sensing of the height or the topology of the surface enables the height of the flying body and its cleaning apparatus to be tracked or aligned in accordance with said surface.

The flying body can be controlled and aligned in accordance with the information sensed by the sensor system.

Thus, sensors may be attached to the ends of the flying body, each of which performs a distance measurement in order to align the flying body parallel to an edge.

In order to save cost and weight, simple sensors such as distance measurement sensors may be used. Said sensors may be attached in a specified location, for example at an angle to or distance from the flying body or the cleaning apparatus.

The geometric features of an object can be sensed in conjunction with both a selected sensor system arrangement and the positioning of the flying body. This enables the use of simple sensor systems.

Given that the sensor system provides additional information all at once, for example in combination with a camera, then less positioning of the flying body will have to take place because the immediate environment is able to be sensed more quickly or more extensively.

The cleaning of the surface can be performed using effectors on the flying body, for example a brush and/or the airflow generated by a rotor, and/or using an effector connected to the flying body via a mounting adapter. Said cleaning apparatus can be movably and/or rigidly attached to the flying body.

The further embodiment according to claim 2 makes it possible to sense the position of the flying body, the position of an object, and the relative position between the flying body and the object based on sensor information and/or calculations, by which means, where appropriate, additional method steps will be made possible.

In conjunction with both a selected sensor system arrangement and the positioning of the flying body, the geometric and relative position can be sensed within special routines or calculation procedures part of methods for the control of flying bodies.

Regarding a relevant sensor system for detecting depth information or edges and contours, there are two immediate application examples.

On the one hand, the sensor system can be combined with the flight control systems of the flying body in order to influence the flight path and its progress or the direct navigation of the flying body, for example its alignment.

The position of the flying body and the cleaning apparatus attached, for example its altitude, can be adjusted and/or regulated according to the sensor information so that the effector has a continuous effect on the surface.

An ideal alignment can be represented by the parallel alignment or tracking of the cleaning apparatus or its working surface in regard to the surface of the object.

The appropriate position of the flying object, for example its altitude and therefore its distance away from the surface of the object to be cleaned can thereby vary in accordance with the cleaning apparatus attached and the design thereof.

The appropriate position, however, can be chosen by a movable arrangement on the cleaning apparatus adjacent to the flying body being able to compensate for inaccuracies on the part of the flying body, for example its altitude, or inaccuracies regarding the surface of an object.

The flying body should therefore not follow a flight route along which the movable arrangement is no longer able to compensate for inaccuracies.

On the other hand, the cleaning apparatus may be controlled separately from the flight control system. As an example, one cleaning apparatus actuator can be controlled in order to, upon departing the surface to be cleaned, cease effector movement and/or retract an effector so that it is aligned away from the ground during landing so that the working surface of the cleaning apparatus effector points away from the ground and does not become dirty or interfere with the landing. Overall, the joining of the cleaning apparatus with a variety of flying bodies can be facilitated in this way.

The alignment and/or positioning of the flying body is also of importance when the effectors are not to act on the surface of an object in an unintended manner. If, for example, the airflow from a flying body is being used at a solar power plant in the desert for the removal of sand, it makes sense after overflying the solar panels or mirror following or during the cleaning process to maintain a large distance from the panels in order not to kick up the surrounding dust and thus dirty the surface once again.

A sensor system can, for example, comprise an optical system using infrared, laser or a camera, but also an acoustic system using ultrasound, radar or a tactile function. Flying bodies, also called drones, possess additional sensors in order to enable navigation and flight safety or in order to support the expansion of the sensor systems mentioned.

Using a force sensor such us a strain gauge, the force exerted on the cleaning apparatus, for example by the surface, can be controlled or a malfunction such as misalignment with the cleaning surface can be detected. Furthermore, by means of sensors for the sensing of weather data such as wind, humidity, time or temperature, or from remote technical information based on sensor data or forecasts regarding climate conditions, operation can be halted or initiated.

One advantageous embodiment of the invention is specified in claim 2. The further embodiment according to claim 2 allows for the expedient approach of the flying body toward the surface of an object to be cleaned.

The routine organizes the movements of the flight body into a sequence, in which there are no undesirable collisions between the flying body and the object to be cleaned while flight paths will be maintained.

In this way, the flying body is initially able to approach a point, also called a waypoint. These points are pre-programmed and, through the setting of various priorities, result in a pattern.

A point comprises both horizontal and vertical position information, as well as the alignment and/or rotation around an axis.

Additional information can be programmed, such as the dwell time at a point. Flight properties such as acceleration or speed between points can also be defined.

If a point is being approached, then at that point and/or even between the points, by means of information sensed via the sensor system, objects and/or their boundaries can be sensed and the flying body then aligned with respect to them.

Through the use of routines in conjunction with the sensor information, the flying body can, on the one hand, approach the object, and, on the other hand, also correct erroneous positions, for example between two points.

If the object is distinctive, for example of modular construction, and possesses distinctive geometric features such as right angles or recurring parallel edges, then these can be used for the flying body to refer to. The placement of points can thus be adjusted precisely.

Using the procedure described, the expedient approach of the flying body and its cleaning apparatus to the surface will be facilitated, and collisions with or misalignment with the object and/or malfunctions will be avoided.

One advantageous embodiment of the invention is specified in claim 3. The further embodiment according to claim 3 makes it possible to depart from an object in accordance with its expanse and/or dimensions, and, if necessary, to subdivide the flight route.

If the object to be cleaned is perhaps wider than the cleaning apparatus, then the surface can be subdivided in accordance with the width of the working surface of the cleaning apparatus.

The flying body will then fly along a number of paths offset adjacent to one another in order to cover the entire surface. In doing so, it may be expedient for the calculated flight paths to overlap the working surface of the cleaning apparatus.

In the process, the sensor system makes it possible to determine all necessary information, such as the dimensions of an object and/or its relative position, and to calculate an efficient and thus energy-saving flight route.

Overall, subdividing the flight route into multiple flight paths contributes to the efficiency of the cleaning process.

A cleaning apparatus or effectors attached to it may be movably attached to the flying body or arranged at a set position or location on the flying body.

In this way, the flight path for cleaning the object can be aligned along the main expanse of the surface without subdividing the flight path too greatly.

One illustrative application is the use of the method for controlling the flying body along an array, which is a collection of solar panels within a solar power plant.

The flying body flies along the main expanse of the array, which saves additional maneuvering, among other things. As a result, the length of the flight path can be reduced and energy saved.

If the cleaning apparatus is unfolded tangential to the direction of flight, then it can be advantageous to guide the flying body along the main expanse of the surface and align the flight route of the flying body accordingly.

If the cleaning apparatus does not cover the surface completely or sufficiently, then it may be useful to fly multiple paths.

In doing so, it is advantageous to use the sensor system edge detection, since this enables an optimal calculation or subdivision of the flight path.

A cleaning apparatus can, via a movable arrangement on the flying body, simplify the flight route and the method for the cleaning of surfaces.

If, for example, a cleaning apparatus is not unfolded in a direction tangential to the direction of flight because perhaps the cleaning apparatus, due to its composition, has a high net weight relative to the working surface of an effector in use and is thus effectively shortened, then it may be advantageous to unfold it in the direction of flight.

In order to expand the working surface of the cleaning apparatus on the surface while in flight, thus in the event of moving or the event of holding in position, said cleaning apparatus may move in a direction tangential to the route of flight.

One illustrative application is the alignment of a rotary brush on the flying body parallel to the direction of flight. Since it is relatively heavy, it is effectively shortened. Through a separate motion with respect to the flying body tangential to its direction of flight, however, in flying over the surface a greater width can be cleaned without the flight route of the flying body having to be greatly subdivided.

One advantageous embodiment of the invention is specified in claim 4.

The further embodiment according to claim 4 enables the surface to be cleaned more efficiently, because, for example, if an anticipated flight route is interrupted perhaps due to the battery of the flying body being exchanged, the flight path or cleaning path can be resumed from the last cleaned position so that the surface already cleaned need not be completely flown again.

It is furthermore advantageous to take into account any tolerances in the positioning accuracy or the flight accuracy of the flying body while resuming the cleaning process.

For example, this can happen in order to ensure that no surface remains uncleaned at the point where the flight path or cleaning path was interrupted, whereby an already cleaned surface can thus be flown repeatedly.

On the one hand, the flying body can take off from and land at a fixed point relative to the object, for example a charging station. On the other hand, it can take off from and land at a variety of points relative to the object.

This can be advantageous if, for example, the position of a landing site has been changed. One illustrative application of this is a robot or vehicle which proceeds between solar panels in order to separately align each of them towards the sun. Landing on such a robot, perhaps to recharge there or to clean the cleaning head or to take off from it, can reduce the flight distance along which no cleaning takes place.

One advantageous embodiment of the invention is specified in claim 5.

The further embodiment according to claim 5 makes it possible for the flying body to approach the object to be cleaned from a defined takeoff and/or landing position in a pre-programmed and thus particularly energy-efficient manner.

A positioning system such as GPS can be used in order to fly towards pre-defined points in an area comprising an object to be cleaned. By doing so, routines otherwise necessary for locating an object and, as appropriate, additional electronics can be avoided and energy saved.

The waypoints may likewise be previously saved by means of a positioning system such as GPS so that they may be defined later.

One embodiment of the invention is shown in the drawings, and will be described hereinafter in detail. Shown are
FIG. 1 a routine for taking off and flying to a waypoint
FIG. 2 a routine for the positioning of an effector
FIG. 3 the side view of a flying body over an object in various positions
FIG. 4 a pattern that is the result of waypoints and/or the subdivision of flight paths The application of the invention at a solar power plant comprising multiple arrays will be explained as an embodiment.

FIG. 1 shows that a query is initially made whether the specifications for takeoff have been satisfied. In doing so, for example, comparison is made to the time of day, because calmer winds tend to occur at night, when the flying body will not cast a shadow.

If the specifications have been satisfied, for example if a specific time of day has come and the environmental requirements for operation have been met, then the flying body will take off by accepting a defined waypoint.

This waypoint is defined horizontally by GPS and vertically by height information.

The necessary orientation will have been determined by a compass, which is likewise found in flying bodies such as multicopters, also called drones, and is likewise accepted by the control electronics present in the flying body.

Furthermore, the waypoint has a number so that it can be distinguished from others and can be flown to in a sequence.

One initial mode of operation is described below:
By means of the sensor system, the flying body senses its environment in order to align the flying body or the attached cleaning apparatus with respect to the surface of the object to be cleaned.
For doing so, the cleaning apparatus is equipped with two distance sensors such as ultrasonic sensors. These measure the distance from the flying body and its cleaning apparatus to an object, and they are oriented towards the ground.
If an object has been detected, thus falling below a distance sensor threshold value, then the flying body will descend so that the cleaning apparatus effector can work on the surface, for example by a strip brush lying against the surface.
In this regard, the distance sensor must be installed in a specified location on the cleaning apparatus in order to be able to utilize the sensor information.

An additional, second mode of operation is described below and shown in FIGS. 2-3:
If the cleaning apparatus (3) is movably arranged on the flying body (1), for example using a mounting adapter (2), then a height for flying over the object to be cleaned (5) will be specified. The object to be cleaned is fixed to the ground (6).
At this altitude, inaccuracies regarding the surface and/or the flying body can be compensated for mechanically by the mobility of the mounting adapter without having to finely control the flying body.

The distance between the mounting adapter and the flying body and thus the cleaning head can be actively controlled. For example, the cleaning head can be actuated to retract or lower via the mounting adapter.

In all modes of operation, the surface to be cleaned is approached or tracked by a cleaning apparatus effector being lowered.

If said surface, for example the glass facade of a high-rise building, is not beneath the flying body but rather next to it, then the term lowering means that the effector approaches the surface to be cleaned.

Accordingly, retracting means that the cleaning apparatus is moved towards the flying body.

Figure 2:
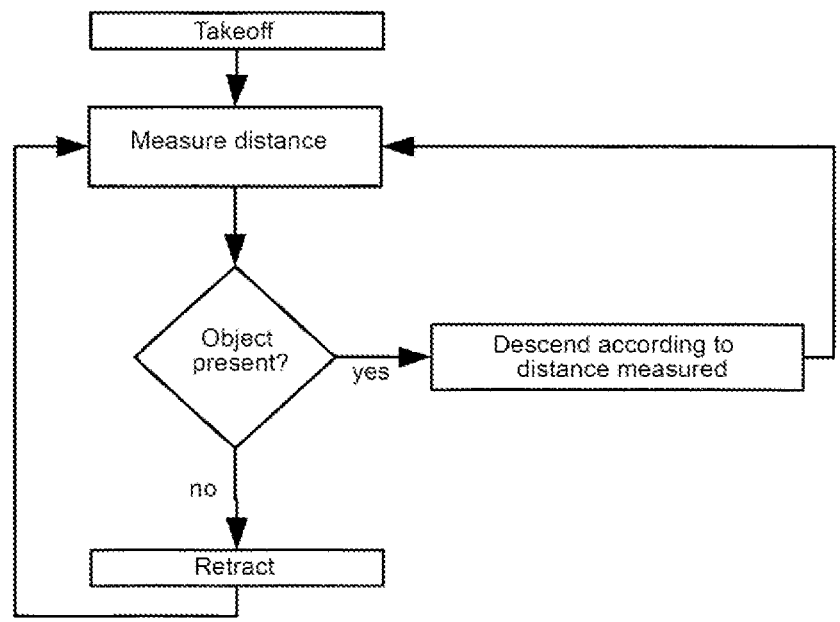

FIG. 2 shows that the distance between the flying body and a nearby object such as the ground or an object to be cleaned will be constantly measured after takeoff.

If the measured value is larger than a threshold value, then no object to be cleaned is present, and the cleaning apparatus will be retracted or rather held in a retracted position.

If an object to be cleaned is present, thus falling below the distance measurement threshold value, then the cleaning apparatus will be lowered.

This routine can run independently of the programming of the flying body, for example in a separate cleaning apparatus control process.

Figure 3:
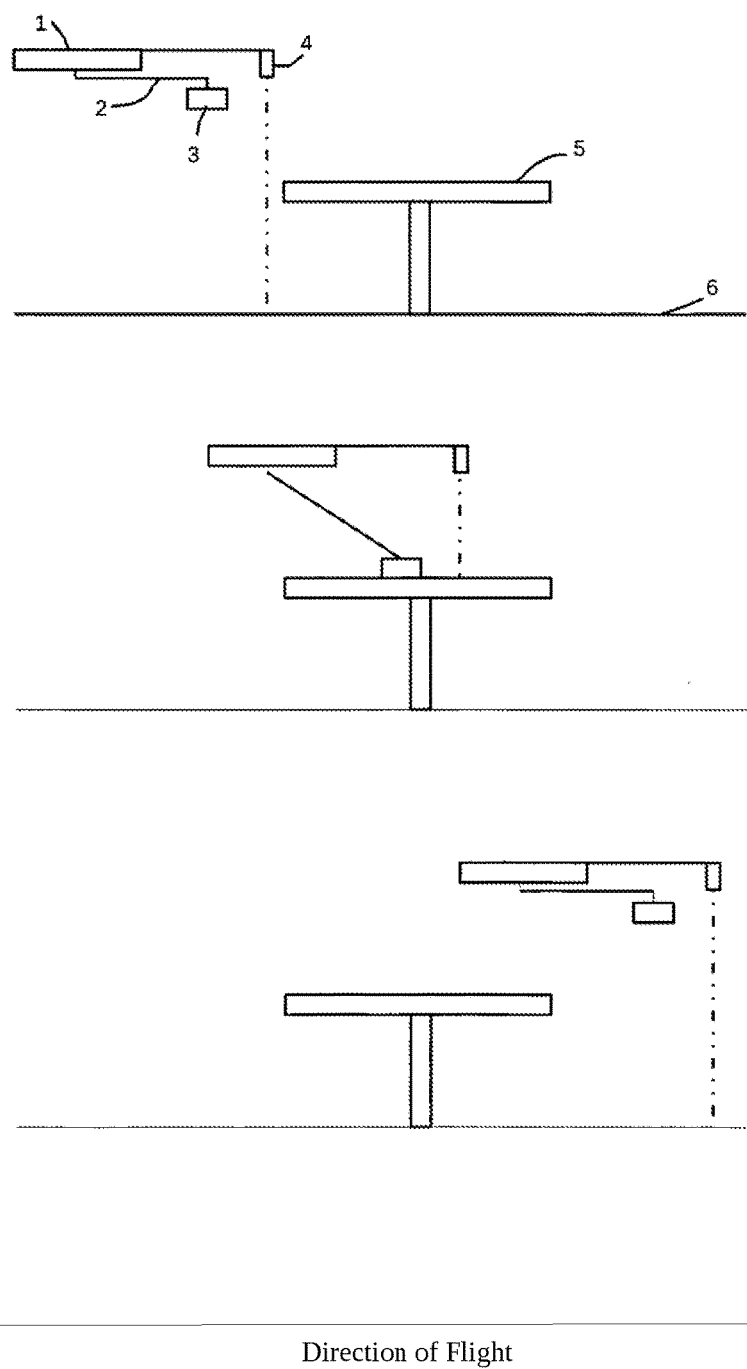

FIG. 3 shows the flying body in the respective positions before, during and after overflying an object.

The control of the cleaning apparatus being dependent on the presence of an object reduces the risk of the flying body possibly colliding with its surroundings.

If a surface has been subdivided multiple times, such as into individual modules, it may then be useful to interlink the distance measurement information and the track measurement information.

In doing so, it is important to avoid the cleaning head being retracted following the end of each module within an array, which is a collection of modular solar structures.

If the means of measuring distance determines that no object to be cleaned is present along the distance of a certain path, then the cleaning apparatus will be retracted. In doing so, the necessary threshold must be greater than or equal to the maximum distance between two modules within an array.

In this way, any unnecessary retraction and lowering of the cleaning apparatus can be avoided. The sensor system (4) measures the distance to objects beneath the cleaning apparatus and in front of the flying body so that control commands can be carried out in advance.

Figure 4:
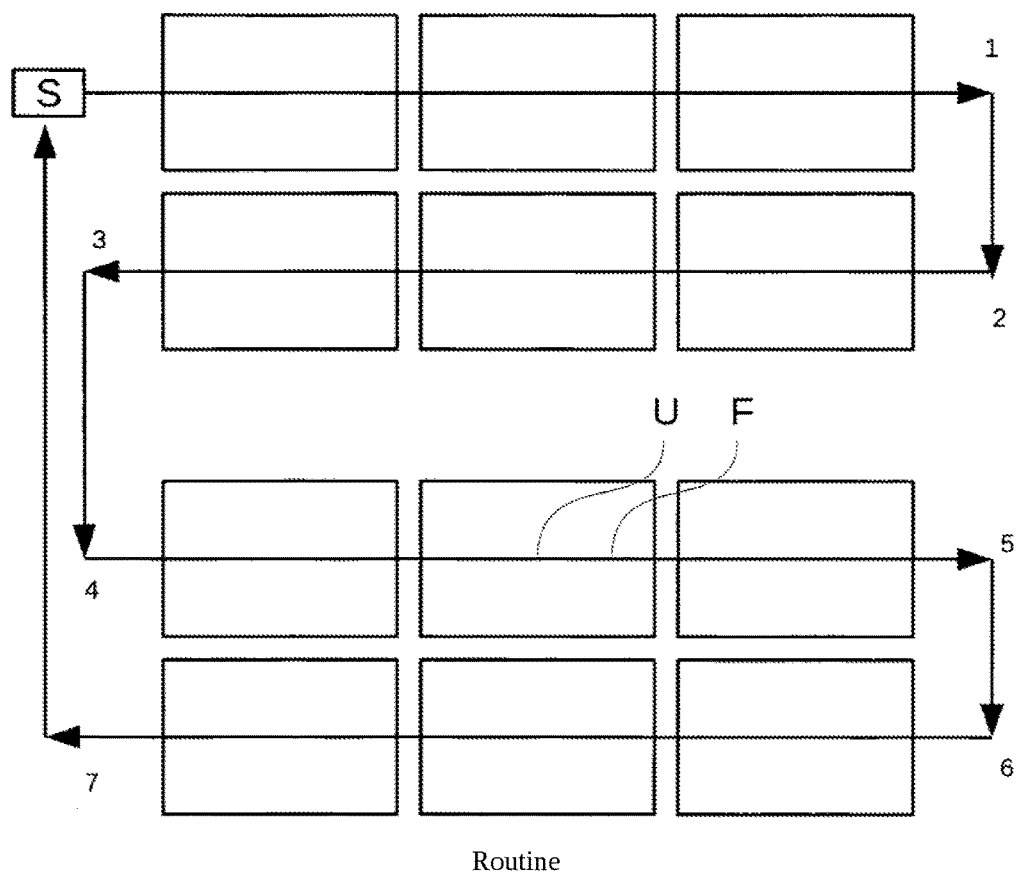

FIG. 4 shows a meandering flight route over two arrays. Said route is chosen in order to fly along the entire surface while using the least energy possible. The flight paths result from the prioritized waypoints, which can be recognized in the drawings at the ends of the arrows and are aligned in parallel with the surface.

The flying body takes off from Point S and, after completing its overflight, lands there.

If the flight route should be interrupted, for example due to the battery capacity of the flying body running low at Point U, then the flying body will fly directly to Point S, where it will land and/or exchange batteries.

After having been interrupted at Point U, the flight route will be resumed from Point F in order to compensate for any possible inaccuracies in the position of the flying body.

The extent and arrangement of the flight path should result in the waypoints being laid out in such a way that the entire width of a cleaning apparatus effector can work on the surface. In this regard, the effector paths should be slightly overlapping in order to compensate for inaccuracies in the positioning of the flying body.

In laying out the waypoints, the sensor system is useful in thereby enabling the flying body to approach the object in accordance with its edges and contours.

If the predefined waypoints necessary for complete coverage are missing or insufficient for the application, then, on the basis of edge detection and thus the sensing of the object, the control electronics for the sensor system and/or the flying body will have to calculate additional suitably aligned paths in succession.

In doing so, it is advantageous to start at one side of the structural expanse of the array and calculate slightly overlapping paths along it.

Corrections to the position as well as the alignment of the flying body can be performed independently of the built-in flight control method, for example that of a multicopter, with the aid of edges, which are represented to the flying body as repetitive geometric structures. The flying body will then be able to align itself, for example parallel to the edge of a module.

The invention claimed is:

1. A method for controlling a flying body for cleaning a surface implemented by a processor, the method comprising: detecting, using a sensor system, geometrical characteristic of an object; aligning the flying body according to the object; cleaning the surface using airflow generated by the flying body; routine sensing a position of the flying body relative to the object.

2. The method for controlling the flying body implemented by a processor according to claim 1, comprising: routine aligning the flying body in a sequence towards the said object and avoiding an undesirable collision with the said object.

3. The method for controlling the flying body implemented by a processor according to claim 1, comprising: subdividing the flight paths of the flying body using a routine and creating maximum effect on the part of a cleaning head on the said surface of the said object.

4. The method for controlling the flying body implemented by a processor according to claim 1, comprising: resuming the flight path at or prior to a point of interruption, in consideration of tolerances, after an interruption of the flight path.

5. The method for controlling the flying body implemented by a processor according to claim 1, comprising: routing a routine that the flying body is approaching pre-programmed, sensor based waypoints.

* * * * *